US011767682B2

(12) United States Patent
Savii Costa et al.

(10) Patent No.: US 11,767,682 B2
(45) Date of Patent: Sep. 26, 2023

(54) TRANSITION PIECE FOR WIND TURBINE TOWER

(71) Applicant: NABRAWIND TECHNOLOGIES, S.L, Pamplona (ES)

(72) Inventors: Hely Ricardo Savii Costa, Urtega (ES); Ion Arocena De La Rúa, Pamplona (ES); Eneko Sanz Pascual, Pamplona (ES); Javier Iriarte Eleta, Zizur Mayor (ES); Jose Alberto Rojo Carrión, San Sebastián de los Reyes (ES)

(73) Assignee: NABRAWIND TECHNOLOGIES, S.L, Pamplona (ES)

( * ) Notice: Subject to any disclaimer, the term of this patent is extended or adjusted under 35 U.S.C. 154(b) by 177 days.

(21) Appl. No.: 17/431,531

(22) PCT Filed: Oct. 31, 2019

(86) PCT No.: PCT/ES2019/070744
§ 371 (c)(1),
(2) Date: Aug. 17, 2021

(87) PCT Pub. No.: WO2021/084143
PCT Pub. Date: May 6, 2021

(65) Prior Publication Data
US 2022/0112738 A1   Apr. 14, 2022

(51) Int. Cl.
*E04H 12/34* (2006.01)
*F03D 13/20* (2016.01)
*E04H 12/00* (2006.01)

(52) U.S. Cl.
CPC ............ *E04H 12/342* (2013.01); *F03D 13/20* (2016.05); *E04H 2012/006* (2013.01); *F05B 2240/9121* (2013.01)

(58) Field of Classification Search
CPC ............ E04H 13/342; E04H 2012/006; F05B 2240/9121; F03D 13/20
See application file for complete search history.

(56) References Cited

U.S. PATENT DOCUMENTS 8,607,508 B2 * 12/2013 Foss .................... E02B 17/0004
52/651.07
9,771,700 B2 * 9/2017 Bleasdale ........... E02B 17/0004
(Continued)

FOREIGN PATENT DOCUMENTS

EP     1 813 808 A2     8/2007
EP     1813808 A2 *    8/2007  ......... E02B 17/0004
(Continued)

OTHER PUBLICATIONS

International Search Report dated Feb. 4, 2020 in corresponding International application No. PCT/ES2019/070744; 4 pages.

*Primary Examiner* — Andrew J Triggs
(74) *Attorney, Agent, or Firm* — Maier & Maier, PLLC

(57) ABSTRACT

A transition piece for a wind turbine tower including a hollow frustoconical piece that is connected to an upper ring and a lower ring. The upper ring is connected to crossbars and the lower ring to radial columns. The transition piece also includes three connectors, each of them being connected to a crossbar, two radial columns and two connection profiles that keep the three connectors joined together, so that a pair of radial columns is arranged between a connector and the lower ring and the crossbars are arranged between the upper ring and a respective connector. The radial columns form an angle of between 65° and 75°, measured between the longitudinal axis of the corresponding radial column with the normal axis of the frustoconical piece.

13 Claims, 6 Drawing Sheets

(56) References Cited

U.S. PATENT DOCUMENTS

| | | | | |
|---|---|---|---|---|
| 2008/0028715 A1* | 2/2008 | Foss | ............ | E02B 17/027 |
| | | | | 52/651.01 |
| 2008/0290245 A1* | 11/2008 | Haugsoen | ............ | E02B 17/027 |
| | | | | 248/673 |
| 2015/0204101 A1 | 7/2015 | Zhao et al. | | |
| 2017/0321659 A1 | 11/2017 | V et al. | | |
| 2020/0340452 A1* | 10/2020 | Drieschner | ............ | F03D 13/20 |
| 2022/0112738 A1* | 4/2022 | Savii Costa | ............ | E04H 12/342 |

FOREIGN PATENT DOCUMENTS

| | | | | |
|---|---|---|---|---|
| EP | 2877654 B1 * | 4/2016 | ............ | E02B 17/0004 |
| EP | 2884027 B1 * | 9/2016 | ............ | E02D 27/42 |
| EP | 3 369 925 A1 | 9/2018 | | |
| EP | 3259404 B1 * | 12/2018 | ............ | B63B 35/003 |
| EP | 3 467 236 A1 | 4/2019 | | |
| FR | 3032682 A1 * | 8/2016 | ............ | B63B 35/003 |
| WO | WO-2016132059 A1 * | 8/2016 | ............ | B63B 35/003 |
| WO | 2017/203065 A1 | 11/2017 | | |
| WO | 2019/043272 A1 | 3/2019 | | |

* cited by examiner

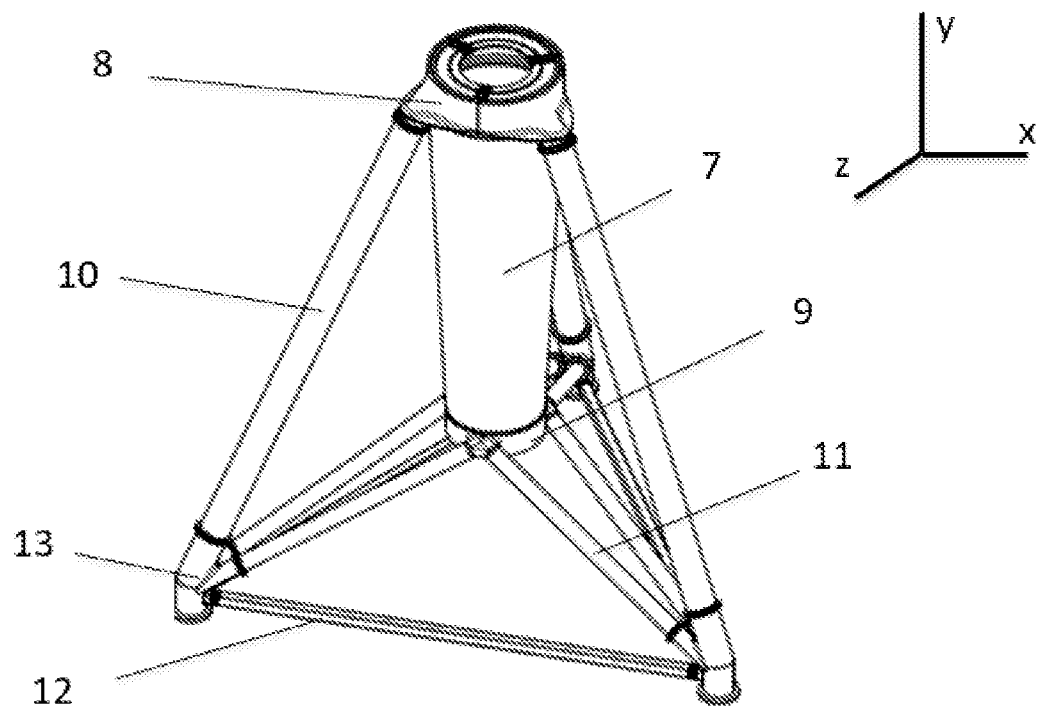
Fig. 2a
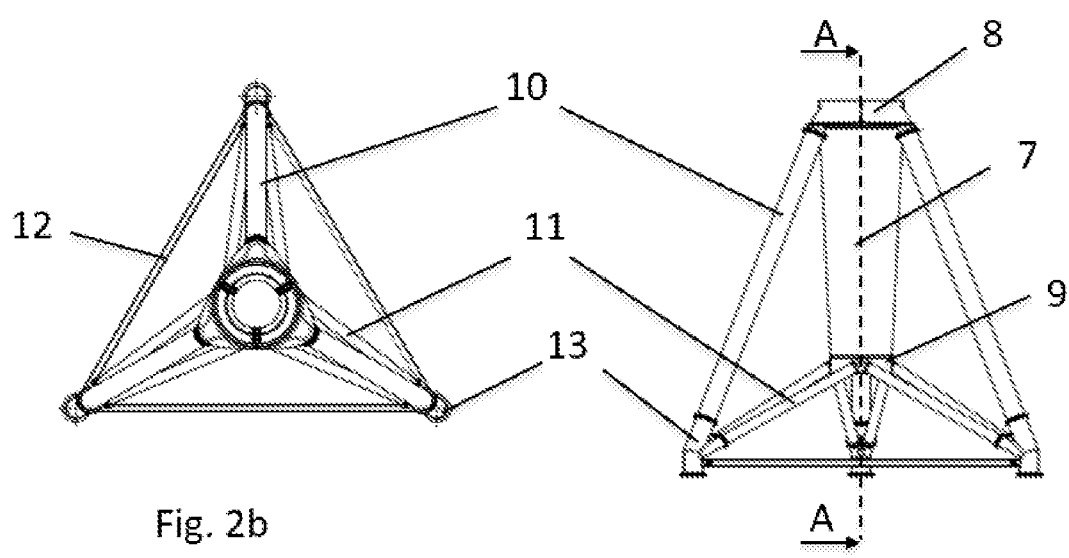
Fig. 2b
Fig. 2c

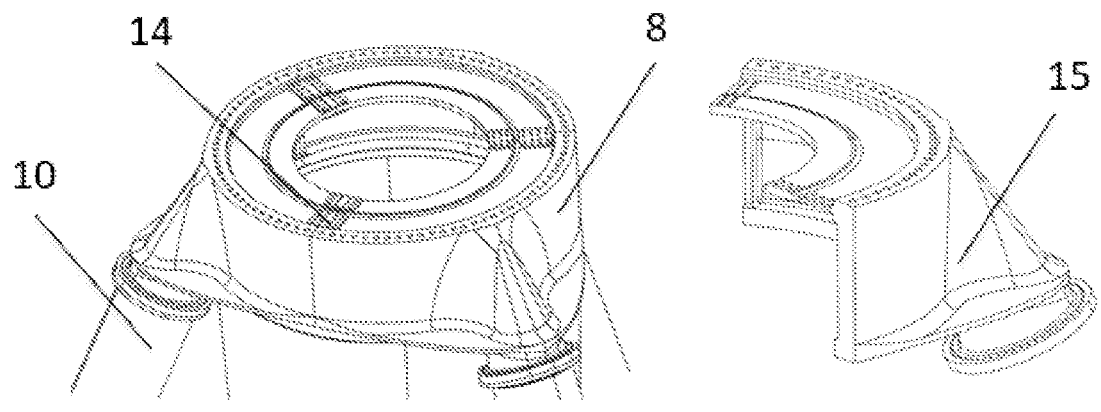
Fig. 5a
Fig. 5b
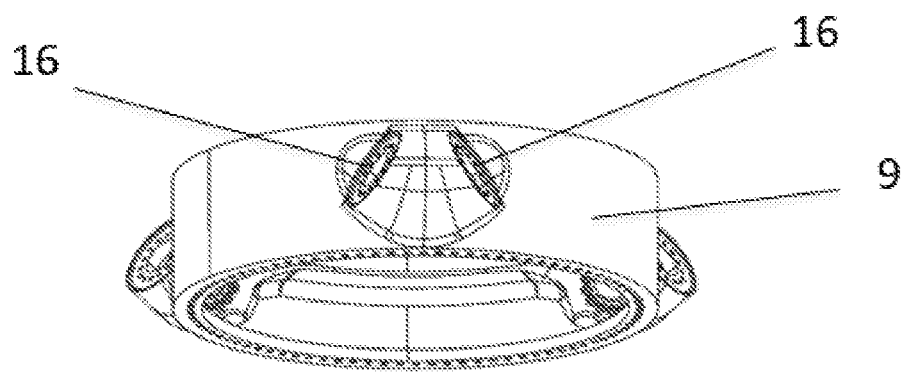
Fig. 6

TRANSITION PIECE FOR WIND TURBINE TOWER

FIELD

This invention falls within the field of wind turbine towers, more particularly, in the transition piece arranged between a hybrid tower with the upper part in the form of a tubular segment and the lower part formed by a lattice segment.

BACKGROUND

Onshore wind turbines must be transported by trucks and lifted with cranes that can move to the final location, this limiting their size and weight compared to other solutions such as, e.g., offshore wind turbines that are transported on ships and use large cranes for their placement.

The same applicant for this invention developed a new transition made up of independent castings that can be transported in conventional trucks and assembled on site. The connection between the tubular tower and the lattice is achieved with a cylindrical central piece and three hollow extensions screwed around the perimeter. As described in document WO2019043272.

Among the existing patents in the state of the art, EP1813808 is analyzed. It refers to a transition for an offshore wind turbine that has a series of crossbars fixed to the tubular tower and to the lower lattice part (with at least three legs). The connecting crossbars are greater in number than the legs and have a preferred inclination of 15°. The lower part has a torsional moment-transmitting ring plate. The main differences of this patent with the current object of the invention are the use of crossbars or struts in the same number as legs and the replacement of the ring plate by a set of radial and horizontal columns with specific technical characteristics.

US2017321659A1 is also noted. The described transition is for an onshore wind turbine, which connects the upper tubular part with the lower lattice part, by means of multiple connecting crossbars that are joined at a single cylindrical end before being connected to their corresponding leg. The lower part is complemented by an arrangement of horizontal columns arranged on the leg itself, which are arranged below the connection between crossbars and legs.

SUMMARY

The design of the current invention is aimed at onshore wind turbines that will not require large cranes for their assembly and will be pre-assembled on the transition piece to later be self-lifted with a lifting system that allows modules to be introduced from the bottom as described in patent application WO2017203065A1.

It is an object of the invention to provide a transition piece, as defined in the claims, that efficiently supports the bending and torsional moment to which it is subjected during use. The design of the transition piece is restricted by weight (offshore solutions with very large thicknesses and very large diameters cannot be used), transportation (pieces must not exceed 18 m to be transported in conventional trucks) and the assembly (it has to be a screwed connection avoiding welds, which, when carried out on site, complicate the operation).

The transition piece of the invention comprises a hollow frustoconical piece that is connected to an upper ring and a lower ring. The upper ring is connected to crossbars included in the transition piece and the lower ring is connected to radial columns also included in the transition piece. The transition piece also comprises three connectors, each of them being connected to a crossbar, two radial columns and two connection profiles that keep the three connectors joined together, so that a pair of radial columns is arranged between a connector and the lower ring, and the crossbars are arranged between the upper ring and a respective connector. The radial columns form an angle of between 65° and 75°, measured between the longitudinal axis of the corresponding radial column with the normal axis of the frustoconical piece.

The radial pieces arranged in pairs, and that are connected to the lower ring in the most tangential extent possible (taking into account that the spacing between legs is 18 m and the diameter of the lower frustoconical piece is 3.3 m), help to withstand the bending and torsional forces to which the transition piece is subjected in use. During the working operation or in use of the wind turbine, the transition piece is subjected to a torsional moment. By tensioning the whole assembly, one of the radial columns is compressed and the other is elongated, so that both radial columns are offset. In this way they duplicate or triplicate their stiffness and solve the problems presented by torsional moments and also those due to bending moments.

It is another object of the invention to maintain uniformity among the pieces used in the lattice tower modules and the pieces used in the transition. The legs of the modules that make up the lattice tower are 1 m in diameter and 12 to 18 m long. The pieces corresponding to the crossbars of said modules also have all of them the same diameter and the same length, minimizing manufacturing costs and standardizing all the pieces as much as possible.

It is another object of the invention that some of the pieces of the transition are modular, in order to facilitate their transport and assembly. For example, the upper ring of the frustoconical piece can be modular to easily overcome limitations in transport.

It is another object of the invention that the lower ring of the frustoconical piece has the maximum diameter possible, ensuring that there is not an excess of material. It has already been previously discussed that this transition piece might be cylindrical. So combining the diameter of the upper ring, which ranges between 4 and 4.5 m to be assembled with conventional cylindrical towers, the diameter of the lower ring is between 3 and 4 m. All of this generates a very lean frustoconical piece, whose final height is limited by transport, being the sum of the two rings and a cylindrical conical or frustoconical piece.

BRIEF DESCRIPTION OF THE DRAWINGS

Below, we will describe very briefly a series of drawings which will help us to better understand the invention and that expressly relate to an embodiment of said invention that is presented as a non-limiting example thereof.

FIG. 2a shows a perspective view of the transition piece according to the Cartesian coordinates XYZ.

FIG. 2b shows a plan view of the transition piece according to the Cartesian coordinates XYZ.

FIG. 2c shows a front view of the transition piece according to the Cartesian coordinates XYZ.

FIG. 5a shows an embodiment of the upper ring of the frustoconical piece.

FIG. 5b shows a sector of FIG. 5a showing the modularity of the assembly.

FIG. 6 shows the lower ring of the frustoconical piece.

DETAILED DESCRIPTION

Figure 1:
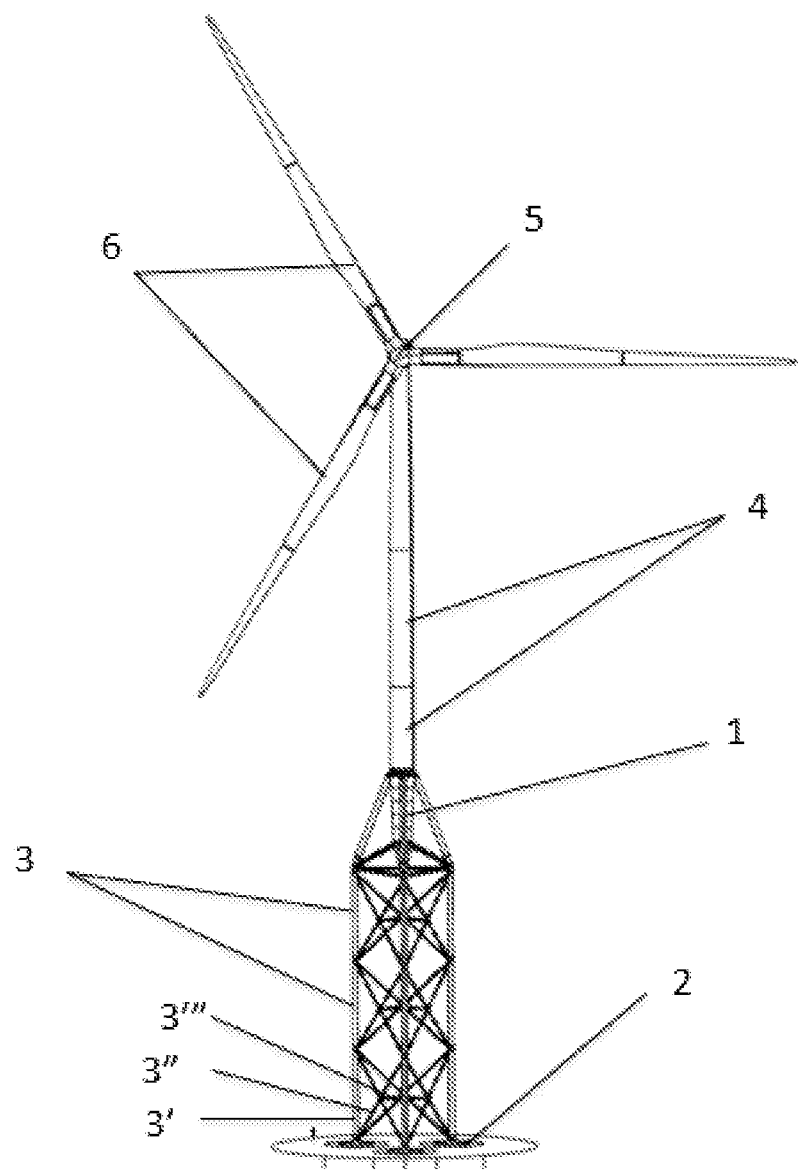
FIG. 1 represents the entire wind turbine object of the invention.

As shown in FIG. 1, the assembly of the transition piece (1) is completed on the foundation (2) from which protrude the bolt cages (not detailed in the figure) which will first connect with the transition piece (1). Once the assembly of the transition piece (1) is completed, using a conventional 100 m high crane, the different parts of the monotubular tower (4) are assembled, and over them, the rotor (5) and its blades (6). At this point, we proceed with the self-lifting system that allows the assembly to be lifted and new lattice modules (3) to be introduced from the bottom until the entire assembly of the wind turbine is completed. Depending on the number of modules (3), a greater or lesser height will be reached in the final tower. These modules are formed by columns or legs (3'), some of which are diagonal (3") and other horizontal (3'''). The maximum diameter of these elements is that of the columns (3'), with 1 m in diameter and with adjustable thicknesses depending on the height of the tower.

The transition piece (1), as shown in detail in FIGS. 2a, 2b and 2c, comprises a central frustoconical piece (7) that is hollow and mechanically welded, topped by an upper ring (8) and ended by a lower ring (9). Both rings are responsible for connecting the rest of the elements that make up the transition piece (1), such as crossbars (10), radial columns (11) and connection profiles (12). The tripod of the transition piece (1) is completed with three connectors (13) that combine the connection of crossbars (10), radial columns (11) and connection profiles (12) with the columns (3') of the lattice modules (3) of the previous figure. Each connector (13) is connected to a crossbar (10), two radial columns (11) and two connection profiles (12) that keep the three connectors (13) joined together, so that a pair of radial columns (11) remains arranged between a connector (13) and the lower ring (9) and the crossbars (10) are arranged between the upper ring (8) and a respective connector (13), said radial columns (11) forming an angle between 65° and 75°, measured between the longitudinal axis of the corresponding radial column (11) and with the normal axis of the frustoconical piece (7).

In the preferred embodiment of the invention, the diameter and thickness of the crossbars (10) is the same as that of the columns (3') of the lattice modules (3). So is their size, so that they can be transported in conventional trucks. The crossbars (10) and the radial columns (11) are preferably circular in shape and the connection profiles (12) preferably square in shape. The connection of all these mentioned elements, together with the connection with the connectors (13) and with the upper (8) and lower (9) rings are preferably carried out with screwed connections with maintenance-free screws.

Figure 3:
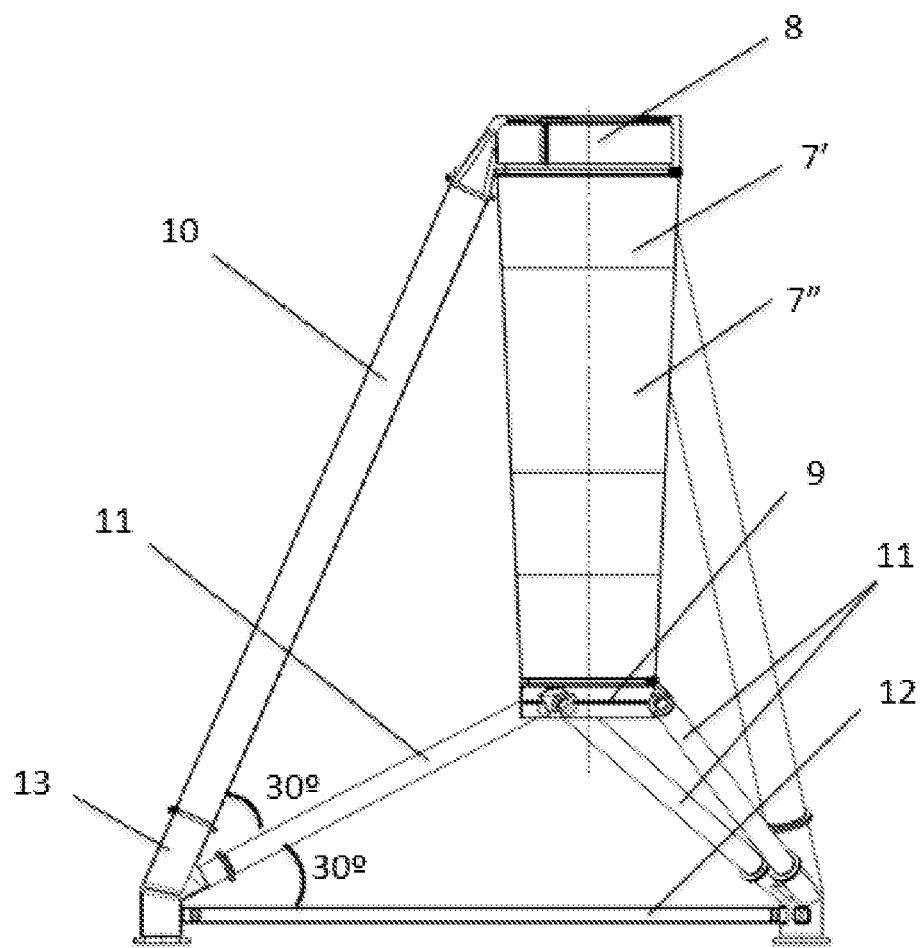
FIG. 3 shows the section AA with regards to the front view of FIG. 2c.

The connectors (13) are connected through their lower end (17) to the columns (3') of the lattice tower, as shown in section AA of FIG. 3 and in FIG. 1, from one of its sides they are connected together with the connection profiles (12) as shown, e.g., in FIG. 2a, through some parts (19) that protrude from an angled area towards the inside of the transition piece (1) they are connected with the corresponding radial columns (11) forming an angle of 25 to 35° with respect to the horizontal column, and through their upper end (18) they make change of direction towards the upper part of the transition piece (1) and they are connected with the corresponding crossbars (10) forming an angle of 55 to 65° from the horizontal column. This elongated connector (13) in its upper part and the downward-extended design of the upper ring (8) make the crossbars (10) to have a length of approximately 16 m so that they can be transported in conventional trucks.

In the preferred embodiment of the invention, the frustoconical piece (7) is formed by different rings (7', 7") welded at the factory in the same way as the ferrules of a tubular tower are welded, reaching a height of around 13 m, with further 2 m to be added for the upper (8) and lower (9) rings. All this gives it a high-rise design, between 12 and 15 m, compared to the upper diameter of 4.5 m and the lower diameter of 3.3 m. The total height of the transition piece (1) is around 15 to 20 m. The thicknesses of all the pieces is constrained as the weight cannot be high. If this is to happen, the tower's natural frequency would decrease. The tower must be non-stiff soft-soft and for this, it must be operated within a natural frequency preventing to increase weight.

In finite-element models correlated on the transition piece (1), it can be seen that the bending moment has two paths: the crossbars (10) are the 30% and the central frustoconical body (7) and its radial columns (11) the 70%. To compensate for these loads, two technical transformations are carried out. The central frustoconical piece (7) is provided with great length, so that the torque acting on it is widely separated and balanced. And the radial columns (11) are arranged in pairs.

Figure 4:
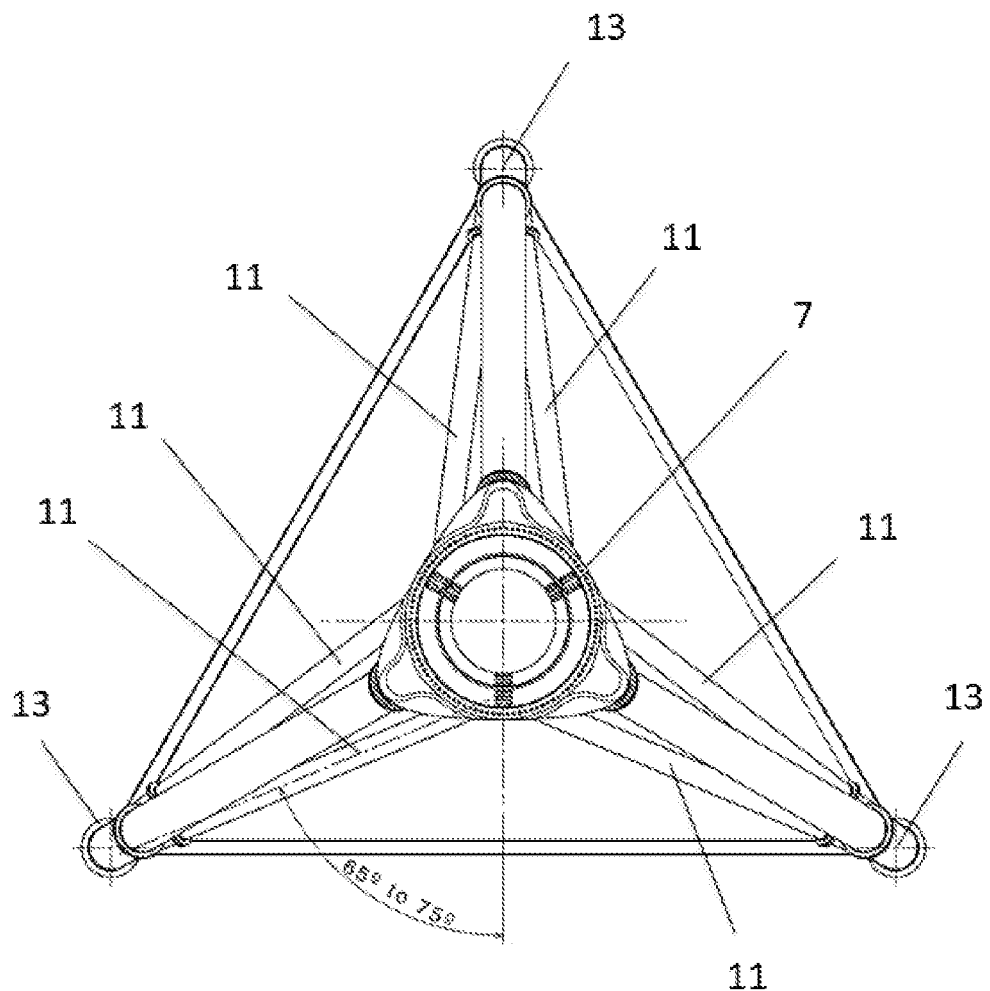
FIG. 4 shows a plant view with the angle formed by the radial columns arranged in pairs.

In FIG. 4 it is shown that the radial columns (11) connected almost tangentially between the corresponding connector (13) and the frustoconical central piece (7) form an angle of around 65° to 75°. It is the angle measured between the longitudinal axis of the corresponding radial column (11) and the normal axis of the frustoconical piece (7), that is, the Y axis according to the drawing of FIG. 2a. When torsioning the transition piece (1) in use, one of the radial columns (11) arranged between a respective connector (13) and the frustoconical piece (7) is compressed and the other radial column (11) arranged between the adjacent connector (13) and the frustoconical piece (7) is elongated, so both radial columns are offset. The rest of the radial columns act in the same way, compressing and elongating in pairs.

On the other hand, if the two radial columns (11) that emerge from the same connector (13) are taken, one of them is compressed and its partner is elongated. This behaviour multiplies the torsional stiffness by two and solves the problems presented at the critical stress concentration points of the transition piece during the working operation or in use of the wind turbine.

In the preferred embodiment of the invention, the upper ring (8) is adapted to connect, preferably by screw connection, to the lower tubular segment (4) of the wind turbine tower. It is a piece of 4 to 4.5 m in diameter, which by adding the protrusions (15) of the connections with the crossbars (10) increase its outer diameter, since said protrusions (15) are external. The protrusions (15) end in flanges with holes through which the connecting screws are inserted.

FIGS. 5a and 5b show another embodiment of the upper ring (8) wherein said upper ring (8) is modular, and as shown in FIG. 5a it can be manufactured in three parts or sectors that are connected together with flat bars (14) overlapping said pieces and screwed on. In this embodiment, the protrusions (15) also end in flanges with holes through which the connecting screws are inserted.

As shown in FIG. 6, the lower ring (9), in the preferred embodiment of the invention, is made of a single piece and comprises connecting areas that are peripheral to the lower ring (9) itself. Each connection area comprises two anchoring points (16) so that from each anchoring point (16) a radial column (11) is fixed and extended which leads to a different connector (13). The screwed connections between an anchoring point (16) and its corresponding radial column (11) are made from inside the connection area, accessing said point through the interior of the lower ring (9).

Likewise, as shown e.g., in FIG. 4, in the preferred embodiment of the invention from each connector (13) two radial columns (11) are extended, said radial columns (11) leading to anchoring points (16) of different connection areas of the lower ring (9).

Figure 7:
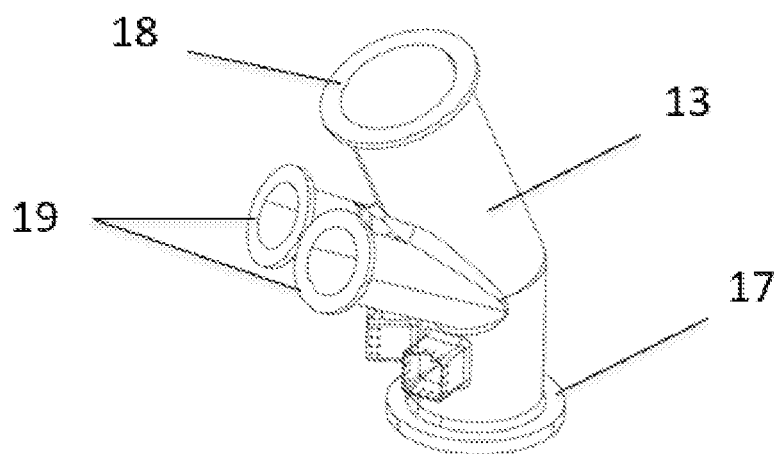
FIG. 7 shows a perspective view of one of the connectors.

FIG. 7 shows one of the three connectors (13) that is arranged in the lower part of the transition piece (1). They have a cylindrical shape that begins straight and ends at an angle. In the straight area, that is, at the lower end (17), it comprises a flange that cooperates with the self-lifting system that raises the completely assembled wind turbine and allows the introduction of modules (3) from the bottom. Said flange is reinforced by overlapping two flanges, one narrower and the other wider, forming a step. Two protruding sections (19), also cylindrical in shape, protrude from the angled area. All the cylindrical ends comprise flanges to complete their screw connection: the upper end (18) with the corresponding crossbar (10), the lower end (17) with the column (3') of the corresponding modules (3) that make up the lattice tower and the protruding sections (19) of the angled area with the corresponding radial columns (11). In the lower part, two squares protrude (they could also have a cylindrical shape) perforated in their periphery and arranged to complete the screwed connection with the connection profiles (12).

The invention claimed is:

1. A transition piece for a wind turbine tower with a nacelle and blades, an upper part of the tower being formed by tubular segments and a lower part of the tower by connection of several lattice modules composed of diagonal and horizontal columns, the transition piece comprising:
   a central hollow frustoconical piece connected to an upper ring and to a lower ring, said upper ring being connected to a plurality of crossbars of the transition piece, and the lower ring connected to a plurality of radial columns of the transition piece, and
   three connectors, each connector of said three connectors being connected to a crossbar of the plurality of crossbars, two radial columns, and two connection profiles that keep the three connectors joined together; and
   a pair of radial columns arranged between a respective connector of the three connectors and the lower ring;
   wherein the crossbars are arranged between the upper ring and a respective connector of the three connectors; and
   wherein the pair of radial columns forms an angle between 65° to 75°, measured between a normal axis of the central hollow frustoconical piece and a longitudinal axis of a radial column of the pair of radial columns that is proximate to the normal axis of the central hollow frustoconical piece.

2. The transition piece according to claim 1, wherein one radial column of the pair of radial columns is compressed in use while the other radial column of the pair of radial columns is elongated.

3. The transition piece according to claim 1, wherein:
   each connector of the three connectors has an angled cylindrical configuration and two parts;
   said two parts are cylindrical and protrude from the angled cylindrical configuration, each of said two parts being adapted to cooperate with an end of a corresponding radial column of the plurality of radial column;
   ends of each connector of the three connectors have flanges for a screwed connection; and
   an upper end of each connector of the three connectors is fixed to a respective crossbar of the plurality of crossbars and a lower end of said connector is configured to be fixed to one of the columns of the tower.

4. The transition piece according to claim 1, wherein each radial column forms an angle of 25 to 35° with respect to a horizontal axis and each crossbar forms an angle of 55 to 65° measured from said horizontal axis.

5. The transition piece according to claim 1, wherein the upper ring is adapted to connect, by screwed connection, to the upper tubular segment of the tower.

6. The transition piece according to claim 1, wherein the crossbars comprise a length and a diameter equal to those of the columns of the lattice modules of the tower.

7. The transition piece according to claim 1, wherein the central frustoconical piece has an upper diameter of 4 to 4.5 m and a lower diameter of 3 to 4 m with a length of between 12 to 15 m.

8. The transition piece according to claim 1, wherein the upper ring is modular and comprises several sectors that are joined together to form the upper ring, said sectors of the upper modular ring being connected with flat bars overlapping said sectors.

9. The transition piece according to claim 1, wherein the upper ring has an external contour and comprises protrusions on the external contour that end in flanges with holes through which connection screws are inserted, which allow connection to corresponding crossbars.

10. The transition piece according to claim 1, wherein the lower ring consists of a single piece and comprises connection areas arranged peripherally to the lower ring itself, each connection area comprising two anchoring points so that from each anchoring point a radial column of the plurality of radial columns is fixed and extending to the respective connector of the three connectors, connections between each anchoring point and its corresponding radial column are located inside the connection area with access from inside the lower ring.

11. The transition piece according to claim 10, wherein two of said plurality of radial columns extend from each of said connectors, said radial columns leading into corresponding anchoring points of different connection areas of the lower ring.

12. The transition piece according to claim 10, wherein a one of said radial columns fixed to one of said anchoring points of said connection area is compressed in use while the other radial column fixed to the other anchoring point of the same connection area is elongated.

13. A wind turbine tower that comprises a nacelle and blades, said tower comprising an upper part formed by tubular segments and the lower part by lattice modules composed of diagonal and horizontal columns, wherein connection between the upper tubular part and the lower lattice part is made through a transition piece according to claim 1.

* * * * *